United States Patent
Bhatt et al.

(10) Patent No.: US 8,984,488 B2
(45) Date of Patent: Mar. 17, 2015

(54) TYPE AND RANGE PROPAGATION THROUGH DATA-FLOW MODELS

(75) Inventors: Devesh Bhatt, Morristown, NJ (US);
Steve Hickman, Morristown, NJ (US);
Manish Patodi, Morristown, NJ (US);
David V. Oglesby, Morristown, NJ (US);
Kirk Schloegel, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 505 days.

(21) Appl. No.: 13/006,750

(22) Filed: Jan. 14, 2011

(65) Prior Publication Data

US 2012/0185729 A1    Jul. 19, 2012

(51) Int. Cl.
G06F 9/44        (2006.01)
G06F 11/36       (2006.01)

(52) U.S. Cl.
CPC ........ G06F 11/3684 (2013.01); G06F 11/3604 (2013.01)
USPC ............................ 717/126; 717/131; 717/132

(58) Field of Classification Search
None
See application file for complete search history.

(56) References Cited

U.S. PATENT DOCUMENTS

| | | | |
|---|---|---|---|
| 5,150,367 A * | 9/1992 | Tong et al. | 714/26 |
| 5,272,704 A | 12/1993 | Tong et al. | |
| 5,572,436 A | 11/1996 | Dangelo et al. | |
| 5,729,554 A | 3/1998 | Weir et al. | |
| 5,732,277 A * | 3/1998 | Kodosky et al. | 717/132 |
| 5,913,023 A | 6/1999 | Szermer | |
| 5,918,037 A | 6/1999 | Tremblay et al. | |
| 6,002,869 A | 12/1999 | Hinckley | |
| 6,064,816 A * | 5/2000 | Parthasarathy et al. | 717/126 |
| 6,173,440 B1 | 1/2001 | Darty | |
| 6,195,616 B1 | 2/2001 | Reed et al. | |
| 6,449,667 B1 | 9/2002 | Ganmukhi et al. | |

(Continued)

FOREIGN PATENT DOCUMENTS

| | | |
|---|---|---|
| EP | 1577755 | 9/2005 |
| EP | 1666187 | 5/2006 |

(Continued)

OTHER PUBLICATIONS

Harrison, "Compiler Analysis of the Value Ranges for Variables", 1977 IEEE; [retrieved on May 9, 2013]; Retrieved from Internet <URL:http://ieeexplore.ieee.org/stamp/stamp.jsp?tp=&arnumber=1702432>;pp. 243-250.*

(Continued)

*Primary Examiner* — Xi D Chen
(74) *Attorney, Agent, or Firm* — Fogg & Powers LLC (57) ABSTRACT

Systems and methods for type and range propagation through data flow models are provided. In one embodiment, a test generating system for processing data flow diagrams, the system comprises: a processor programmed to perform a test generation process; and at least one memory device coupled to the processor, the at least one memory device including a data flow diagram. The test generation process computes range information and data type information for outputs of one or more functional blocks defined by the data flow diagram by applying transformations to input range information for inputs of each of the one or more functional blocks. The transformations are at least in part performed by applying specific mathematical and functional effects that are predefined for each of the one or more functional blocks based on block type.

19 Claims, 9 Drawing Sheets

(56) References Cited

U.S. PATENT DOCUMENTS

| | | | |
|---|---|---|---|
| 6,473,794 B1 | 10/2002 | Guheen et al. | |
| 6,570,459 B1 | 5/2003 | Nathanson et al. | |
| 6,615,166 B1 | 9/2003 | Guheen et al. | |
| 6,671,874 B1 | 12/2003 | Passova | |
| 6,938,228 B1 | 8/2005 | Zhong | |
| 6,944,848 B2 | 9/2005 | Hartman et al. | |
| 7,043,309 B2* | 5/2006 | Jackson et al. | 706/53 |
| 7,051,322 B2* | 5/2006 | Rioux | 717/132 |
| 7,219,328 B2 | 5/2007 | Schloegel et al. | |
| 7,272,752 B2 | 9/2007 | Farchi et al. | |
| 7,296,188 B2 | 11/2007 | Paternostro et al. | |
| 7,412,430 B1 | 8/2008 | Moore | |
| 7,457,729 B2 | 11/2008 | Khoche et al. | |
| 7,490,319 B2 | 2/2009 | Blackwell et al. | |
| 7,644,334 B2* | 1/2010 | Hickman et al. | 714/741 |
| 7,698,668 B2 | 4/2010 | Balasubramanian et al. | |
| 7,735,058 B2 | 6/2010 | Kinsella et al. | |
| 7,793,273 B2* | 9/2010 | Mercer et al. | 717/126 |
| 8,006,239 B2* | 8/2011 | Sankaranarayanan et al. | 717/131 |
| 8,356,290 B2* | 1/2013 | Mercer et al. | 717/132 |
| 8,397,187 B2* | 3/2013 | Sawada | 716/106 |
| 8,407,675 B1* | 3/2013 | Clark | 717/131 |
| 8,423,879 B2* | 4/2013 | Bhatt et al. | 717/132 |
| 8,448,155 B2* | 5/2013 | Bordelon et al. | 717/131 |
| 8,479,169 B1* | 7/2013 | Evans | 717/131 |
| 8,494,832 B2* | 7/2013 | Krishnan et al. | 717/126 |
| 8,539,451 B2 | 9/2013 | Ivancic et al. | |
| 2003/0014703 A1 | 1/2003 | Chakravarthy et al. | |
| 2003/0128214 A1 | 7/2003 | Oglesby et al. | |
| 2004/0044990 A1 | 3/2004 | Schloegel et al. | |
| 2004/0088677 A1 | 5/2004 | Williams | |
| 2004/0143811 A1 | 7/2004 | Kaelicke et al. | |
| 2004/0169591 A1 | 9/2004 | Erkkinen | |
| 2005/0004786 A1 | 1/2005 | Thomason | |
| 2005/0043913 A1 | 2/2005 | Hyde et al. | |
| 2005/0097515 A1 | 5/2005 | Ribling | |
| 2005/0114841 A1 | 5/2005 | Moskowitz et al. | |
| 2005/0187643 A1 | 8/2005 | Sayyar-Rodsari et al. | |
| 2005/0223295 A1 | 10/2005 | Hermes et al. | |
| 2006/0010428 A1 | 1/2006 | Rushby et al. | |
| 2006/0010429 A1 | 1/2006 | Ihara | |
| 2006/0101402 A1 | 5/2006 | Miller et al. | |
| 2006/0117302 A1* | 6/2006 | Mercer et al. | 717/131 |
| 2006/0155411 A1 | 7/2006 | Khoche et al. | |
| 2006/0155520 A1 | 7/2006 | O'Neill et al. | |
| 2006/0206870 A1 | 9/2006 | Moulden, Jr. et al. | |
| 2006/0253839 A1 | 11/2006 | Avritzer et al. | |
| 2006/0265691 A1 | 11/2006 | Klinger et al. | |
| 2007/0028219 A1 | 2/2007 | Miller et al. | |
| 2007/0028220 A1 | 2/2007 | Miller et al. | |
| 2007/0266366 A1 | 11/2007 | Bucuvalas | |
| 2007/0277151 A1* | 11/2007 | Brunel et al. | 717/132 |
| 2007/0288899 A1 | 12/2007 | Fanning et al. | |
| 2008/0015827 A1 | 1/2008 | Tryon, III et al. | |
| 2008/0028364 A1 | 1/2008 | Triou et al. | |
| 2008/0086705 A1 | 4/2008 | Balasubramanian et al. | |
| 2008/0120521 A1 | 5/2008 | Poisson et al. | |
| 2008/0126902 A1 | 5/2008 | Hickman et al. | |
| 2009/0083699 A1 | 3/2009 | Santhanam | |
| 2009/0125887 A1* | 5/2009 | Kahlon et al. | 717/126 |
| 2009/0287958 A1 | 11/2009 | Bhatt et al. | |
| 2009/0287963 A1 | 11/2009 | Oglesby et al. | |
| 2010/0079458 A1* | 4/2010 | Koehler et al. | 345/440 |
| 2010/0175052 A1 | 7/2010 | Prasad et al. | |
| 2010/0192128 A1 | 7/2010 | Schloegel et al. | |
| 2011/0054835 A1 | 3/2011 | Takamasu et al. | |
| 2011/0246970 A1* | 10/2011 | Ganai et al. | 717/132 |
| 2011/0258607 A1* | 10/2011 | Bhatt et al. | 717/126 |
| 2011/0264990 A1* | 10/2011 | Sawada | 714/811 |
| 2012/0210173 A1 | 8/2012 | Schloegel et al. | |

FOREIGN PATENT DOCUMENTS

| | | |
|---|---|---|
| EP | 1677187 | 7/2006 |
| EP | 2131285 | 12/2009 |
| JP | 10154055 | 6/1998 |
| JP | 2005352670 | 12/2005 |

OTHER PUBLICATIONS

Blume, Eigenmann, "Symbolic Range Propagation", 1995 IEEE; [retrieved on May 10, 2013]; Retrieved from Internet <URL:http://ieeexplore.ieee.org/stamp/stamp.jsp?tp=&arnumber=395956>;pp. 357-363.*

Diwan, et al., "Simple and Effective Analysis of Statically-Typed Object-Oriented Programs", 1996 ACM; [retrieved on Sep. 5, 2013]; Retrieved from Internet <URL:http://pdf.aminer.org/000/522/075/simple_and_effective_analysis_of_statically_typed_object_oriented_programs.pdf>;pp. 1-15.*

Gough, Klaeren, "Eliminating Range Checks using Static Single Assignment Form";1994; published online; [retrieved on Sep. 4, 2013]; Retrieved from Internet <URL:http://citeseerx.ist.psu.edu/viewdoc/download?doi=10.1.1.55.207&rep=rep1&type=pdf>;pp. 1-16.*

Hierons, et al., "Using Formal Specifications to Support Testing"; 2009 ACM; [retrieved on Dec. 3, 2014]; Retrieved from Internet <URL:http://dl.acm.org/citation.cfm?id=1459352.1459354>;pp. 9:1-9:76.*

Sahoo, et al., "Using Likely Invariants for Automated Software Fault Localization"; 2013 ACM; [retrieved on Dec. 3, 2014]; Retrieved from Internet <URL:http://dl.acm.org/citation.cfm?id=2451116.2451131>;pp. 139-151.*

Bhatt, et al., "Quantifying Error Propagation in Data Flow Models", 2013 IEEE; [retrieved on Dec. 3, 2014]; Retrieved from Internet <URL:http://ieeexplore.ieee.org/stamp/stamp.jsp?tp=&arnumber=6601567>; pp. 2-11.*

Papadopoulos, et al., "Automating the Failure Modes and Effects Analysis of Safety Critical Systems"; [retrieved on Dec. 3, 2014]; Retrieved from Internet <URL:http://ieeexplore.ieee.org/stamp/stamp.jsp?tp=&arnumber=1281774>; pp. 1-2.*

Anirudhan et al., "Symbolic Test Generation for Hierarchically Modeled Digital Systems", "International Test Conference 1989", 1989, pp. 461-469, Publisher: IEEE, Published in: Washington DC, USA.

Bhatt, D. et al, "Model-Based Development and the Implications to Design Assurance and Certification", "Digital Avionics Systems Conference", Oct. 30, 2005, vol. 2, Publisher: IEEE.

Bhatt et al., "Towards Scalable Verification of Commercial Avionics Software", "Proceedings of the AIAA Infotech@Aerospace Conference", Apr. 2010, pp. 1-8, Publisher: American Institue of Aeronautics and Astronautics, Published in: USA.

Bhatt et al., "HiLITE: An Approach and Tool for Test Generation from Model-Based Functional Requirements", "Presentation—1st International Workshop on Aerospace Software Engineering", May 22, 2007, Publisher: Honeywell International Inc.

Bhatt et al., "An Approach and Tool for Test Generation From Model-Based Functional Requirements", May 2007, Publisher: Honeywell Laboratories, Minneapolis.

Bhatt, D. et al., "HiLite-Honeywell Integrated Lifecycle Tools and Environment", "Aerospace Advanced Technology-Slides Version 2", Apr. 2008, Publisher: Honeywell.

Borcsok et al., "An Automated Software Verification Tool for Model-based Development of Embedded Systems with Simulink", "XXII International Symposium on Information, Communication and Automation Technologies", 2009, Publisher: IEEE.

Hi-Keung Tony Ma et al., "Test Generation for Sequential Circuits", "IEEE Transactions on Computer Aided Design of Integrated Circuits and Systems", Oct. 1, 1988, pp. 1081-1093, vol. 7, No. 10, Publisher: IEEE, Published in: Piscataway, NJ, USA.

"Simulink—Simulation and Model-Based Design", "http://www.mathworks.com/products/simulink accessed Sep. 1, 2010", 2007, Publisher: The MathWorks, Inc.

(56) References Cited

OTHER PUBLICATIONS

Moore, R.E., "Interval Arithmetic and Automatic Error Analysis in Digital Computing", "Applied Mathematics and Statistics Laboratories", Nov. 15, 1962, No. 25, Publisher: Stanford University California.

Neema, S. et al., "Signal Processing Platform: A Tool Chain for Designing High Performance Signal Processing Applications", "Proceedings IEEE", Apr. 8-Oct. 2005, pp. 302-307, Publisher: Southeastcon, Published in: Ft. Lauderdale, FL.

Niermann et al., "Hitec: A Test Generation Package for Sequential Circuits ", "Proceedings of the European Conference on Design Automation", 1991, pp. 214-218, Publisher: IEEE, Published in: Los Alamitos, CA, USA.

"OMG Unified Modeling Language Specification, version 1.5", Mar. 1, 2003, pp. 31-35 to 3-154, vol. 3, No. 9, Publisher: Object Management Group (OMG).

Sorenson, UFFE, "Static Single-Assignment Form and Value Range Propagation for UPPAAL", "available at http://www.uffesorensen.dk/Uni/dat8/SSA_and_VRP_for_UPPAAL.pdf", Jun. 2008.

"Stateflow 7-Design and Simulate State Machines and Control Logic", 2007, Publisher: The Mathworks.

Abdurazik et al., "Generating Test Cases from UML Specifications", May 1999, pp. 1-111, Publisher: Information and Software Engineering George Mason University.

Hong et al., "Automatic Test Generation from Statecharts Using Model Checking", 2001, pp. 1-29, Publisher: University of Pennsylvania.

Kansomkeat et al., "Automated-Generating Test Case Using UML Statechart Diagrams", 2003, pp. 1-5, Publisher: SAICSIT.

Pasareanu et al., "Model Based Analysis and Test Generation for Flight Software", Sep. 2008, pp. 1-11, Publisher: NASA Ames Research Center.

Schatz et al., "Model-Based Development of Embedded Systems", 2002, pp. 1-13, Publisher: Institut Fur Informatik, Technishe Universitat Munchen.

Hendrik Eshuis, "Semantics and verification of UML activity diagrams for workflow modeling", Oct. 25, 2002, pp. 2-240, Publisher: Rik Eshuis.

U.S. Patent and Trademark Office, "Notice of Allowance", "U.S. Appl. No. 11/945,021", Aug. 21, 2009, pp. 1-9.

U.S. Patent and Trademark Office, "Notice of Allowance", "U.S. Appl. No. 12/247,882", Dec. 12, 2012, pp. 1-5.

U.S. Patent and Trademark Office, "Pre-Appeal Brief Decision", "U.S. Appl. No. 12/247,882", Nov. 28, 2012, pp. 1-2.

International Searching Authority, "International Search Report", "From PCT/US2007/085555", Jul. 8, 2008, pp. 1-6, Published in: WO.

European Patent Office, "European Search Report", mailed Mar. 19, 2012, Published in: EP.

Agrawal et al., "Semantic Tranlation of Simulink/Stateflow Models to Hybrid Automata Using Graph Transformations", "Electronic Notes in Theoretical Computer Science", 2004, pp. 43-56, vol. 109.

Alur et al., "Symbolic Analysis for Improving Simulation Coverage of Simulink/Stateflow Models", "EMSOFT'08", Oct. 19-24, 2008, pp. 89-98, Published in: Atlanta, Georgia, USA.

Alur, "A Theory of Timed Automata", "Theoretical Computer Science", Apr. 1994, pp. 183-235, vol. 126, Publisher: Elsevier Science B.V.

Alur, "The Algorithmic Analysis of Hybrid Systems", "Theoretical Computer Science", Feb. 1995, pp. 3-34, No. 138.

Benveniste, "The Synchronous Languages 12 Years Later", "Proceedings of the IEEE", Jan. 2003, pp. 64-83, vol. 91, No. 1, Publisher: IEEE.

Bhatt, "Towards Scalable Verification of Commercial Avionics Software", "In Proceedings of the AIAA Infotech at Aerospace Conference", Apr. 2010, pp. 1-7, Publisher: American Institute of Aeronautics and Astronautics.

Durrieu , "Formal Proof and Test Case Generation for Critical Embedded Systems Using Scade", "World Computer Congress-IFIP", 2004, pp. 499-504, vol. 156.

Ferrell, "RTCA DO-17B/EUROCAE ED-12B", 2001, pp. 1-11, No. 27, Publisher: CRC Press LLC.

Fosdick, et al., "Data Flow Analysis in Software Reliability", "Computing Surveys", Sep. 1976, pp. 305-330, vol. 8, No. 3, Publisher: Association for Computing Machinery (ACM), Published in: Boulder, Colorado, US.

Halbwachs et al., "The Synchronous Dataflow Programming Language Lustre", "Proceedings of the IEEE", Sep. 1991, pp. 1-41, vol. 79, No. 9, Publisher: IEEE.

Hamon, "An Operational Semantics for Stateflow", "International Journal on Software Tools for Technology Transfer (STTT)", Oct. 2007, pp. 447-456, vol. 9, No. 5-6, Publisher: SRI International.

Hamon, "A Denotational Semantics for Stateflow", "In Proceedings of EMSOFT", 2005, pp. 164-172, Publisher: EMSOFT '05.

Harel, "Statecharts: A Visual Formalism for Complex Systems", "Science of Computer Programming", 1987, pp. 231-274, vol. 8, Publisher: Elsevier Science Publishers B.V.

Henzinger et al., "What's Decidable About Hybrid Automata?", "Journal of Computer and System Sciences", 1998, pp. 1-48, vol. 57.

"LDRA Tool Suite", "http://www.ldra.com/Accessed May 11, 2011", 2011, p. 1 Publisher: LDRA Ltd.

"Matlab and Simulink", "http://www.mathworks.com/ Accessed May 11, 2011", 1994-2011, p. 1 Publisher: The MathWorks, Inc.

"Vector Software. Vectorcast.", "http://www.vectorcast.com/ Accessed on May 11, 2011", 2011, p. 1 Publisher: Vector Software.

Kahn, "The Semantics of a Simple Language for Parallel Programming", "In Information Processing", 1974, pp. 471-475.

Lee, "Synchronous Data Flow", "Proceedings of IEEE", Sep. 1987, pp. 1235-1245, vol. 75, No. 9, Publisher: IEEE.

Ouaknine, "On the Language Inclusion Problem for Timed Automata: Closing a Decidability Gap", "In Proceedings of Logic in Computer Science", 2004, pp. 54-63.

Petri, "Communication With Automata", "PhD Thesis", Jan. 1966, pp. 1-97, vol. 1, Publisher: University of Bonn.

Rushby, "An Evidential Tool Bus", "Proc. of 7th International Conference on Formal Engineering Methods", 2005, pp. 1-10, Publisher: SRI International, Published in: Menlo Park, California, USA.

"Quantifying Error Propagation in Data Flow Models", Obtained Apr. 12, 2011, pp. 1-10, Publisher: Honeywell Aerospace Advanced Technology.

Tiwari, "Formal Semantics and Analysis Methods for Simulink Stateflow Models", "http://www.csl.sri.com/users/tiwari/html/stateflow.html Accessed May 11, 2011", 2002, pp. 1-12, Publisher: SRI International.

Tripakis et al., "Translating Discrete-Time Simulink to Lustre", "ACM Journal Name", Jan. 2005, pp. 1-40, vol. V, No. N.

Bhatt, "Method for Automated Error Detection and Verification of Software", "U.S. Appl. No. 12/949,596 filed on Nov. 18, 2010", , pp. 1-16.

Schloegel, "Error Propagation in a System Model", "U.S. Appl. No. 13/167,983, filed on Jun. 24, 2011", Jun. 24, 2011.

"SCADE Suite", "http://www.esterel-technologies.com/ Accessed May 11, 2011", 2011, pp. 1-4, Publisher: Esterel Technologies, Inc., Published in: France.

Zhou et al., "A Framework of Hierarchical Requirements Patterns for Specifying Systems of Interconnected Simulink/Stateflow Modules", 2007, pp. 1-6.

Alur, "A Theory of Times Automata", "Theorectical Computer Science", Apr. 1994, pp. 183-235, vol. 126, Publisher: Elsevier Science B.V.

Alura, "The Algorithmic Analysis of Hybrid Systems", "Theorectical Computer Science", Feb. 1995, pp. 3-34, No. 138.

Benveniste, "The Synchronous Languages 12 Year Later", "Proceedings of the IEEE", Jan. 2003, pp. 64-83, vol. 91, No. 1, Publisher: IEEE.

"LDRA Tool Suite", "http:/lwww.ldra.com/Accessed May 11, 2011", 2011, p. 1 Publisher: LDRA Ltd.

Zhou et al. "A Framework of Hierarchical Requirements Patterns for Specifying Systems of Interconnected Simulink/Stateflow Modules", 2007, pp. 1-6.

European Patent Office, "Office Action", Jul. 2, 2012, Published in: EP.

(56) References Cited

OTHER PUBLICATIONS

European Patent Office, "Office Action", "from Foreign Counterpart of U.S. Appl. No. 12/949,596", Jan. 19, 2012, Published in: EP.

U.S. Patent and Trademark Office, "Advisory Action", "U.S. Appl. No. 12/247,882", Aug. 31, 2012, pp. 1-3.

U.S. Patent and Trademark Office, "Final Office Action", "U.S. Appl. No. 12/247,882", Jun. 21, 2012, pp. 1-10.

U.S. Patent and Trademark Office, "Office Action", "U.S. Appl. No. 12/247,882", Jan. 9, 2012, pp. 1-33.

Schulte et al, "Dynamic Analysis of Bounds Versus Domain Propagation", "Logic Programming", Dec. 9, 2008, pp. 332-346, Publisher: Springer Berlin Heidelberg.

European Patent Office, "European Patent Office", "from Foreign Counterpart of U.S. Appl. No. 11/945,021", Oct. 28, 2012, pp. 1-4, Published in: EP.

Japanese Patent Office, "Office Action", "from Foreign Counterpart of U.S. Appl. No. 11/945,021", Nov. 7, 2013, pp. 1-5, Published in: JP.

European Patent Office, "European Office Action", "from Foreign Counterpart of U.S. Appl. No. 13/167,983", Mar. 8, 2012, pp. 1-9, Published in: EP.

European Patent Office, "European Search Report", "from Foreign Counterpart of U.S. Appl. No. 13/167,983", Feb. 20, 2012, pp. 1-4, Published in: EP.

U.S. Patent and Trademark Office, "Office Action", "from U.S. Appl. No. 13/167,983", Nov. 20, 2013, pp. 1-35, Published in: US.

University of Regina, "Chapter Three, Error Propagation in Calculations", "Physics Undergraduate Laboratory Companion", Jul. 2008, pp. 9-20.

U.S. Patent & Trademark Office, "Final Office Action", "from U.S. Appl. No. 13/167,983", Sep. 8, 2014, pp. 1-19, Published in: US.

\* cited by examiner

| Block Class | Block Type | Output Type | Output Range |
|---|---|---|---|
| Bitwise | Bit Shift | Unsigned Integer | 0x0 -> 0xFFFFFFFF (or 0xFFFFFFFFFFFFFFFF depending on the unsigned int size) – regardless of input range |
| Bitwise | Bitwise AND | Unsigned Integer | 0x0 -> [min over all inputs of the max of each input] |
| Constant | Constant | Based on specified constant value | Equals constant value |
| Control Flow | Switch | Union of input types | Union of all ranges of all feasible value inputs. Input is feasible if range of control input includes its selection value |
| Conversion | Convert Float-to-U32 | Unsigned Integer | 0 -> max(input); if min(input) < 0, then union with (UINTMAX- abs(min(input))+1 -> UINTMAX) |
| Conversion | Convert U32-to-Float | Float | Same as input range |
| Conversion | Typecast | Based on Typecast Type | Same as input range, but possibly trucated based on typecase type |
| Limiter | Asymmetrical Limiter | Same as input type | Intersection of input range and range imposed by limiter |
| Limiter | Dead Zone | Same as input type | Intersection of input range and range imposed by dead zone limiter |
| Limiter | Range Limit Block | Same as input type | Intersection of input range and range imposed by limiter |
| Limiter | Rate Limit Block | Same as input type | Same as input range |
| Limiter | Symmetrical Rate Limiter | Same as input type | Same as input range |
| Logic | AND | Boolean | if either in1_range or in2_range are [0]:  [0]<br>if both in1_range and in2_range are [1]:  [1]<br>else:  [0,1] |
| Logic | NAND | Boolean | if either in1_range or in2_range are [0]:  [1]<br>if both in1_range and in2_range are [1]:  [0]<br>else:  [0,1] |

TABLE 1

FIG. 3A

| Block Class | Block Type | Output Type | Output Range |
|---|---|---|---|
| Logic | NOR | Boolean | if either in1_range or in2_range are [1]: [0]<br>if both in1_range and in2_range are [0]: [1]<br>else: [0,1] |
| Logic | NOT | Boolean | if in1_range is [0]: [1]<br>if in1_range is [1]: [0]<br>else: [0,1] |
| Logic | OR | Boolean | if either in1_range or in2_range are [1]: [1]<br>if both in1_range and in2_range are [0]: [0]<br>else: [0,1] |
| Logic | XOR | Boolean | if in1_range is [1] and in2_range is [0]: [1]<br>if in1_range is [0] and in2_range is [1]: [1]<br>if in1_range is [0] and in2_range is [0]: [0]<br>if in1_range is [1] and in2_range is [1]: [0]<br>else: [0,1] |
| Math | Absolute Value | Same as input type | if in1_range crosses zero: [0, (max(abs (in1_range_min), abs(in1_range_max)))]<br>if in1_range < 0: [abs(in1_rang_max), abs(in1_range_min)]<br>else: in1_range |
| Math | Angle Summation | Union of input types | modulus interval MI is either (0->360) or (-180->180) or something else depending on settings. Then if any input range is larger than MI, then output range is MI. Else, for each input range, find ModdedIRX = Modulus(IRsubX,MI). Then, output range min = sum(over all X of min(ModdedIRX)); output range max = sum(over all X of max(ModdedIRX)); final output range = modulus (output range, MI); |

TABLE 1 (cont).

FIG. 3B

| Block Class | Block Type | Output Type | Output Range |
|---|---|---|---|
| Math | ArcCosine | Float | Interpolate from in1_range_min and in1_range_max |
| Math | ArcSine | Float | Interpolate from in1_range_min and in1_range_max |
| Math | ArcTangent | Float | Interpolate from in1_range_min and in1_range_max |
| Math | ArcTangent 2 | Float | Interpolate from in1_range_min and in1_range_max |
| Math | Average | Union of input types | Take min and max values of the averages of all boundary values |
| Math | Ceiling | Integer | Output Range = ceil(min(IR)),ceil(max(IR)) |
| Math | Cosine | Float | Interpolate from in1_range_min and in1_range_max |
| Math | Difference | Union of input types | Take min and max values of the difference of all input1 boundary values from all input2 boundary values |
| Math | Divide | Union of input types | Take min and max values of the quotient of all input1 boundary values from all input2 boundary values |
| Math | Exponential | Union of input types | Take min and max values of the power of all boundary values |
| Math | Floor | Integer | Output Range = floor(min(IR)),floor(max(IR)) |
| Math | Gain | Same as input type | if gain value is >= 0: [in1_range_min*gain, in1_range_max*gain] else: [in1_range_max*gain, in1_range_min*gain] |
| Math | Ground | Integer | Output Range = [0] |
| Math | Maximum Value | Union of input types | Take min and max values of the maximum of all boundary values |
| Math | Minimum Value | Union of input types | Take min and max values of the minimum of all boundary values |
| Math | Modulus | Union of input types | [0, in2_range_max] |
| Math | Product | Union of input types | Take min and max values of the product of all boundary values |

FIG. 3C    TABLE 1 (cont).

| Block Class | Block Type | Output Type | Output Range |
|---|---|---|---|
| Math | Round | Integer | ceil(min(IR)−0.5),floor(max(IR)+0.5) generally. However, if either input range endpoint is the midpoint of a rounding interval:<br>For Round up: move that endpoint to the next higher round value;<br>For Round down: move that endpoint to the next lower round value;<br>For Round towards even: move that endpoint to the closest even round value;<br>For Round towards odd: move that endpoint to the closest odd round value;<br>For Round towards larger magnitude: move that endpoint to the closest round value with larger magnitude;<br>For Round towards smaller magnitude: move that endpoint to the closest round value with smaller magnitude; |
| Math | Sign | Integer | [−1,1] |
| Math | Sign Comparison | Boolean | [0,1] |
| Math | Sine | Float | Interpolate from in1_range_min and in1_range_max |
| Math | Square Root | Float | [sqrt(in1_range_min), sqrt(in1_range_max)] |
| Math | Summation | Union of input types | Take min and max values of the sum of all boundary values |
| Math | Tangent | Float | Interpolate from in1_range_min and in1_range_max |
| Relational | Equal To | Boolean | if all ranges are point ranges and equal: [1]<br>if union of ranges is empty set: [0]<br>else: [0,1] |

TABLE 1 (cont).

FIG. 3D

| Block Class | Block Type | Output Type | Output Range |
|---|---|---|---|
| Relational | Greater Than | Boolean | if in1_range_max > in2_range_min: [1]<br>if in2_range_max >= in2_range_min: [0]<br>else: [0,1] |
| Relational | Greater Than or Equal To | Boolean | if in1_range_max >= in2_range_min: [1]<br>if in2_range_max > in2_range_min: [0]<br>else: [0,1] |
| Relational | Less Than | Boolean | if in1_range_max < in2_range_min: [1]<br>if in2_range_max <= in2_range_min: [0]<br>else: [0,1] |
| Relational | Less Than or Equal To | Boolean | if in1_range_max <= in2_range_min: [1]<br>if in2_range_max < in2_range_min: [0]<br>else: [0,1] |
| Relational | Not Equal To | Boolean | if all ranges are point ranges and equal: [0]<br>if union of ranges is empty set: [1]<br>else: [0,1] |
| Signal | Inport | Specified or default | Specified or default |
| Signal | Outport | Specified or default | Specified or default |
| Signal | Sample Time | Float | [1.0/model_rate] |
| Signal Processing | Debounce | Same as input type | Same as input type |
| Signal Processing | Falling Edge One-Shot | Boolean | Same as input range |
| Signal Processing | One Shot Block | Boolean | Same as input range |
| Signal Processing | Rising Edge One-Shot | Boolean | Same as input range |
| Signal Processing | Sliding Window Debounce | Same as input type | Same as input range |
| State/Memory | Sample and Hold | Same as input type | Same as input range |

TABLE 1 (cont).

FIG. 3E

| Block Class | Block Type | Output Type | Output Range |
|---|---|---|---|
| State/Memory | Set-Reset Flip-Flop | Same as input type | Same as input range |
| State/Memory | Set-Reset Latch | Same as input type | Same as input range |
| State/Memory | Simple Delay | Same as input type | Same as input range |
| Table | Look-Up Table N-D | Union of entry types | Union of entry values |
| Time-Dependent | Frame Delay | Same as input type | Same as input range |
| Timer | Confirm OFF | Boolean | if timed input range is [1]: [0]<br>else: [0,1] |
| Timer | Confirm ON | Boolean | if timed input range is [0]: [0]<br>else: [0,1] |
| Vector/Matrix | Cross Product | Vector of Floats | The min and max values of the product of all boundary values of the two input vectors |
| Vector/Matrix | Dot Product | Same as input type | Sum of product ranges of the input vector |
| Vector/Matrix | Matrix Constant | Based on specified constant values | Union of constant values |
| Vector/Matrix | Matrix Product | Union of entry types | Output element (i, j) equals the Dot Product Range of Input1_row_i and Input2_column_j |
| Vector/Matrix | Transpose | Same as input type | Output element (i, j) equals range of input (j, i) |

TABLE 1 (cont).

TYPE AND RANGE PROPAGATION THROUGH DATA-FLOW MODELS

CROSS-REFERENCE TO RELATED APPLICATIONS

This application is related to co-pending U.S. patent application, Ser. No. 12/247,882 entitled "METHOD FOR HYBRID TEST GENERATION FOR DIAGRAMS USING COMBINED DATA FLOW AND STATECHART NOTATIONS" filed on Oct. 8, 2009 and Published at U.S. Patent Publication 2009/0287958, herein incorporated in its entirety by reference and referred to herein as the '882 application.

This application is related to issued U.S. patent application, Ser. No. 11/945,021 entitled "REQUIREMENTS-BASED TEST GENERATION" filed on Nov. 26, 2007 and issued as U.S. Pat. No. 7,644,344, herein incorporated in its entirety by reference and referred to herein as the '021 application.

BACKGROUND

Verification of software for safety critical commercial aircraft applications is a difficult problem with associated large amounts of time and cost. Model-based development (MBD) tools are widely used to define algorithms, or sets of algorithms, used to implements control systems such as flight controls, engine controls, navigation, and the like. Using these tools, tests can be automatically created to verify that the implementation of data-flow block diagrams will correctly conform to the intended model for a particular control system. The automation of test generation has great potential for significantly reducing the time and cost associated with software verification.

A problem exits, however, with existing range propagation methods utilized by MBD tools in that they can result in loose bounds. They may even default in worst-case bounds for propagation through complex blocks. Further, range-based defect analyses that reason about how the bounds of input signals to different types of model structures can result in false positives (i.e., false alarms) when ranges bounds are not tight. Meanwhile, requirements-based test generation methods that rely on type and range propagation may produce lower requirements coverage using looser bounds of signals compared to the same method using tighter bounds or may require significantly longer computation time or significantly more memory.

For the reasons stated above and for other reasons stated below which will become apparent to those skilled in the art upon reading and understanding the specification, there is a need in the art for improved systems and methods for type and range propagation through data flow models.

SUMMARY

The Embodiments of the present invention provide methods and systems for type and range propagation through data flow models and will be understood by reading and studying the following specification.

Systems and methods for type and range propagation through data flow models are provided. In one embodiment, a test generating system for processing data flow diagrams, the system comprises: a processor programmed to perform a test generation process; and at least one memory device coupled to the processor, the at least one memory device including a data flow diagram. The test generation process computes range information and data type information for outputs of one or more functional blocks defined by the data flow diagram by applying transformations to input range information for inputs of each of the one or more functional blocks. The transformations are at least in part performed by applying specific mathematical and functional effects that are pre-defined for each of the one or more functional blocks based on block type.

DRAWINGS

Embodiments of the present invention can be more easily understood and further advantages and uses thereof more readily apparent, when considered in view of the description of the preferred embodiments and the following figures in which:

FIGS. 3A-F illustrate a functional effect table of one embodiment of the present invention.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention address the problems of the prior art by propagating data type and operating range data from model input blocks (which are specified in the model diagram and/or symbol files) topologically through the rest of the blocks in the model to the model output blocks. In this propagation, the universal data type, language independent representation, and operating range are determined for all inputs and outputs of each block instance in the model. The propagation takes into account the specific mathematical and functional effects of each library block. In one embodiment, the details regarding the specific mathematical and functional effects of each library block are stored in a file and retrieved during the software validation process. In other embodiments, these details for each library block are stored as objects associated with their respective block.

Figure 1:
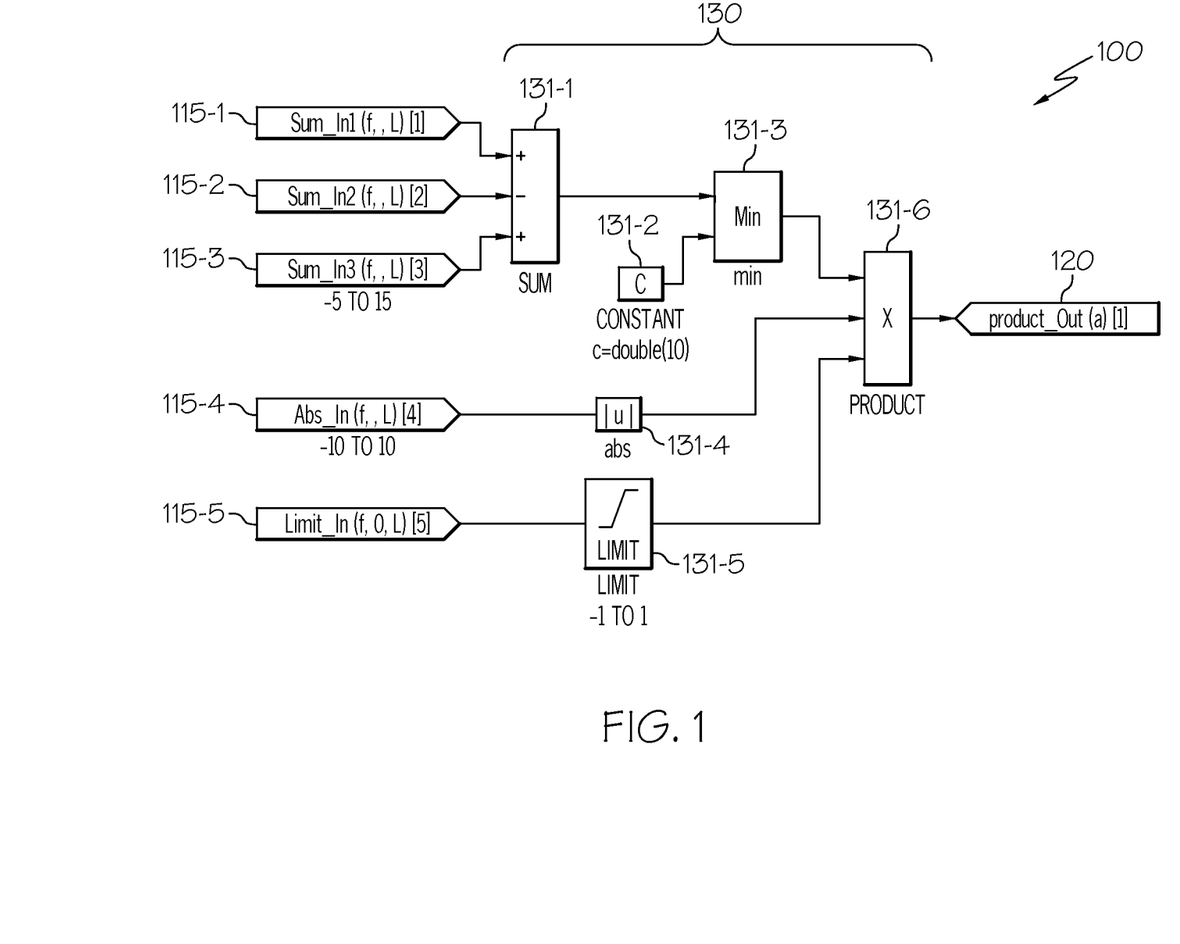
FIG. 1 is an example of a data flow diagram to be processed with one embodiment of the present invention.

FIG. 1 is a diagram illustrating a data flow diagram 100 for a model. A data flow diagram, such as diagram 100, is a directed, possibly cyclic, diagram where each block (also referred to as blocks) perform some type of function, and arcs (shown as arrows) that connect the blocks indicate how data flows from one block to another when the diagram 100 is processed. Data flows defined by the arcs are uni-directional. As would be appreciated by one of ordinary skill of the art upon reading this application, there is nothing special about the particular diagram illustrated in FIG. 1. It simply provides an example to assist in describing embodiments of the present invention. That is, embodiments of the present invention are not limited to processing any one particular data flow diagram.

The particular model shown in FIG. 1 includes five Inport blocks 115-1 to 115-5 (Sum_In1, Sum_In2, Sum_In3, Abs_In, and Limit_In) which are input blocks representing diagram level inputs. A Outport block 120 (Product_Out) represents a diagram level output. That is, data flows into diagram 100 from the Inport blocks 115-1 to 115-5 and resulting data flows out of diagram 100 from Outport block 120. Between these Inport and Output blocks, function blocks (shown generally at 130) identify library functions such as, but not limited to, filters, trigonometric functions, timers, arithmetic functions, limits, and Boolean operations. For more advanced functions, the function of any one of block 130s can themselves be defined by their own data flow diagram (i.e., a sub-model) which is evaluated as that block is processed. For the model diagramed in FIG. 1, a sum block 131-1 is structured to add the sum of Sum_In1 and Sum_In3 to the inverse of Sum_In2. Block 131-2 outputs a constant value "C" to Min block 131-3, which in turn will output the lesser of "C" or the output received from sum block 131-1. Block 131-4 inputs from Abs_In, and outputs the absolute value of Abs_In. Block 131-5 takes its input from Limit_In, and provides an output that is limited from −1 to 1. Finally, block 131-6 takes the product of the outputs from blocks 131-3, 131-4 and 131-5, and outputs the result at Outport block 120.

With embodiments of the present invention, data type and operating range data are defined and propagated from each Inport block 115-1 to 5 topologically through the functional blocks 130. As each of the functional blocks 130 are processed, output data type and operating range data are defined for each of their respective outputs with knowledge of the type and operating range data of any inputs they receive and the nature of the functions they perform.

For example, for Inports 115-1 to 3, the range and data type is captured by the notation (f,0,L) indicating that that the type of data of the input variable is floating (f), has with a default value of zero (0) and that the inport variable is latched (L). The possible ranges of the inport blocks are specified as well. For example, Inports 115-1 to 3 in FIG. 1 each have a defined range of −5 to 15. Range data can optionally define both an allowable range and an expected normal range. Ranges, data type, and other information deemed important for a particular model can also be specified within the file containing the diagram, in separate symbol files or default values may be used when information is not specified. It is also not necessary for the range information to be continuous, it may be defined as a split range. For example, for one or more blocks, the range information can define a range of integer values from 1 to 5 and 100 to 110. For such a range, the minimum possible value is 1, the maximum possible value is 110, but values of 6 to 99 are not possible inputs for that block. The components of split ranges are referred to herein as sub-ranges. Hence, 1 to 5 is a sub-range of the full range 1 to 5 and 100 to 110. A special case of a range is a point value. In this case the min and max values are the same. Split ranges can also have point value sub-ranges.

Blocks 130 may be hierarchically composed by associating a lower-level model with a particular block type. We refer to the lower-level model as the sub-model and the associated block type as the parent block type. The sub-model then specifies further details of the complex behavior of the parent block type. The type and range propagation for a particular parent block 130 will depend upon the internal structures and modeling notation semantics of the sub-model. Some embodiments of the present invention utilize a recursive application to all sub-models that model parent blocks 130 within a data-flow diagrams 100. In addition, the ranges of the Inports and Outports blocks of the sub-models themselves can be further constrained by specifying constrained ranges in an external symbol file.

With the range and data type for the Inport blocks 115-1 to 5 defined, the range and data type of all inputs and outputs of each intermediate functional block 130 are computed by propagating the information for each Inport block 115-1 to 5 instance downstream (this is, through the arcs towards the Outport block 120) and applying it to the semantics of each incident functional block 130. This propagation continues until the range and data type for all model Outport instances (for this example, product_Out block 120) are determined from the outputs of the immediately upstream blocks. In one embodiment, both maximum allowable and expected normal operating ranges are propagated from the model's inport blocks to the outport blocks. A "maximum allowable range" for a block is the maximum range allowed by the data type and other hard constrains (for example, a hardwired constant) present at the block's input. The "operating range" for a block is the range as limited by the effects of prior blocks in a model's diagram.

The propagation through any particular functional block 130 takes into account the particular semantics defined that block (i.e., the specific functional computation performed by the block according to the block's requirements). For example, the function performed by limit block 131-5 is to pass the input it receives within defined limits. For example, limit block 131-5 is defined to limit its output to a range of −1 to 1, meaning that any input value between −1 to 1 is passed as is, but for inputs outside of that range, the output from block 131-5 is clamped so that all inputs less than −1 produce an output of −1 and all inputs greater than 1 produce an output of 1. Block 131-4, which performs an absolute value function, has an output range limited to values greater than or equal to zero.

Certain mathematical operators have output ranges that are mathematically related to their input ranges. As a further example, assuming possible input range of values from 0 to $2\pi$ radians, a block for the function $A*\operatorname{Sin}(x)$ would have a possible output range that is limited to values from −A to +A. However, for this function the values of −A to +A would not correspond to the minimum input of x=0 or maximum input of x=$2\pi$ (both of which would produce an output value of zero). Instead, maximum and minimum output values from this block would occur at $\pi/2$ and $3\pi/2$, respectively. As such, when processing cyclical or other non-linear functional blocks, the possible output range and data type propagated to the next block needs to be determined accordingly by interpolation to determine the minimum and maximum values that will occur across the entire input range.

Utilizing the specific functional computation of each incident block 130 in propagating ranges avoids results with looser bounds on downstream signals. Given the ranges at each of the inputs of a block 130, the output range is computed as an upper bound of values resulting from the block's computation, using all possible combinations of the values at each of the inputs, varied independently within its range.

Other examples of the effects on type and range for different classes of blocks are as follows. For a time-dependent block (for example, a rate limiter, filter), the range of a time step is computed as the minimum and maximum values possible over infinite time (that is, for example, when the output of the block reaches an asymptotic or steady state). For functional blocks with a reset functionality, the effect of the range of a reset value input is considered in addition to the main input. For other blocks comprising circular functions (such as modulus, sine, cosine, and tangent, for example) the output range computation for that block takes into account if a value in the input range crosses circular boundary value(s) representing local maxima, minima, and/or an output discontinuity. For a block with range limits on the output, the range computation reflects the effect of the range limits over the normal computation of the block. If the block's computation and the input range values are such that an overflow condition (for example, a divide by zero) is possible on the output, the high end of the output range is computed using a small offset from the value that would produce the condition. One of ordinary skill in the art upon reading this specification would appreciate that there may be more than one way to determine a value. In this particular case, if it is known the calculated value will be infinite, it is not necessary to compute anything. In the other examples of calculations provided in this disclosure, there may be multiple ways to determine output range as well. In alternate embodiments, the output type and range definitions for each functional block type are provided via a symbol file, incorporated into objects defining each block, or can be selected by prompting a user.

Figure 2:
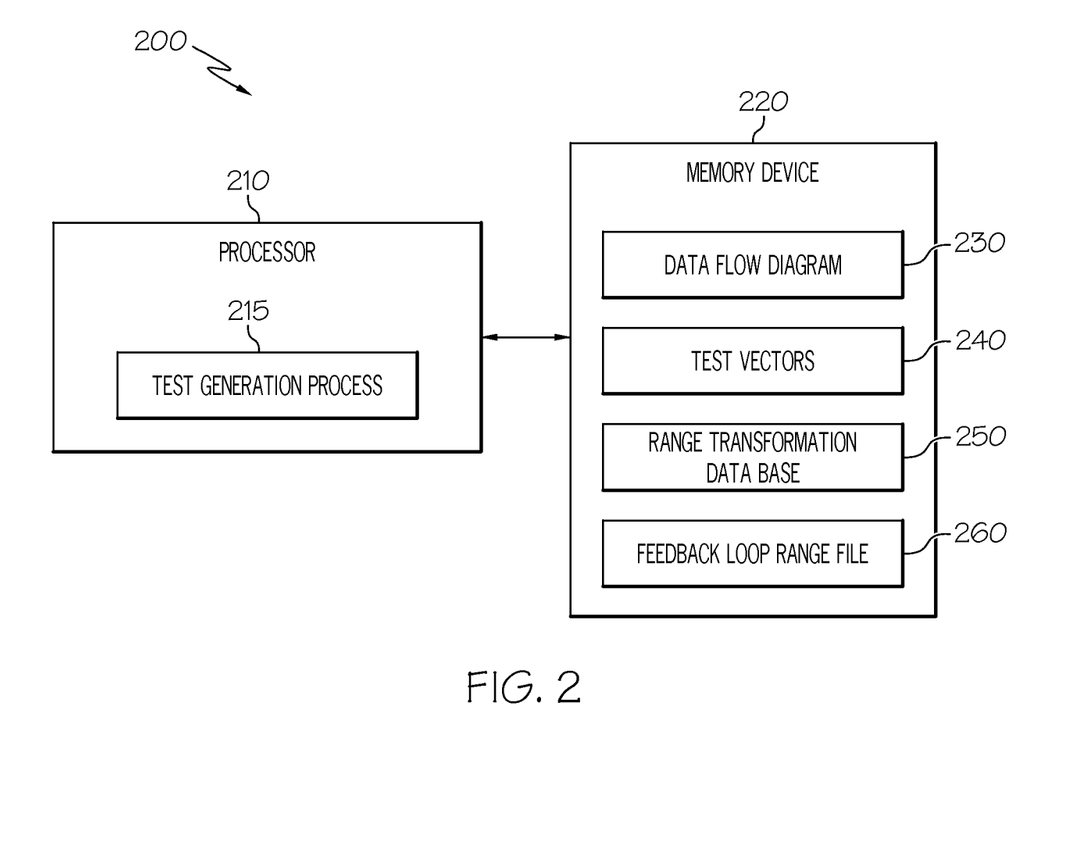
FIG. 2 is a block diagram illustrating a test generating system of one embodiment of the present invention.
Figure 3D:
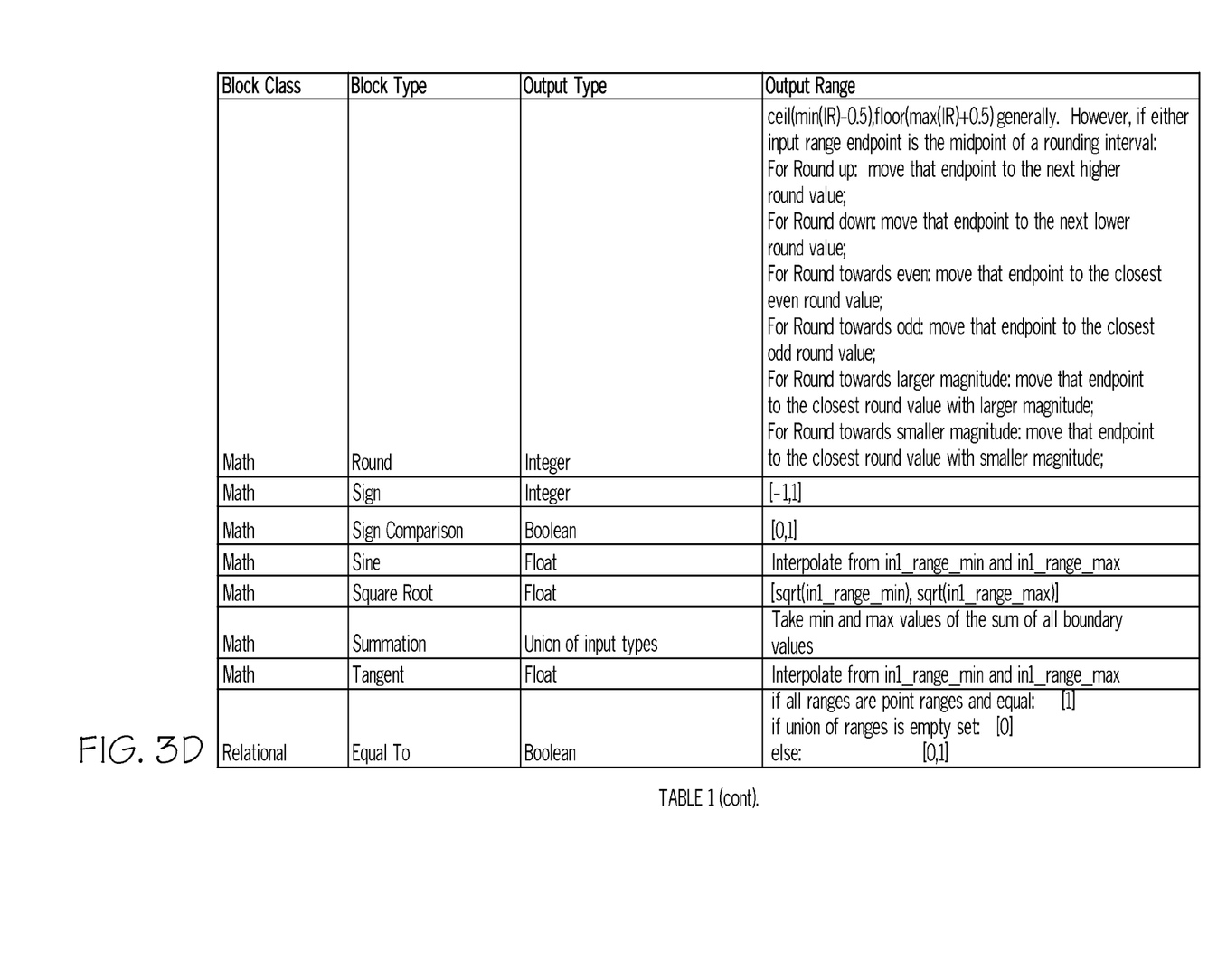
Figure 3E:
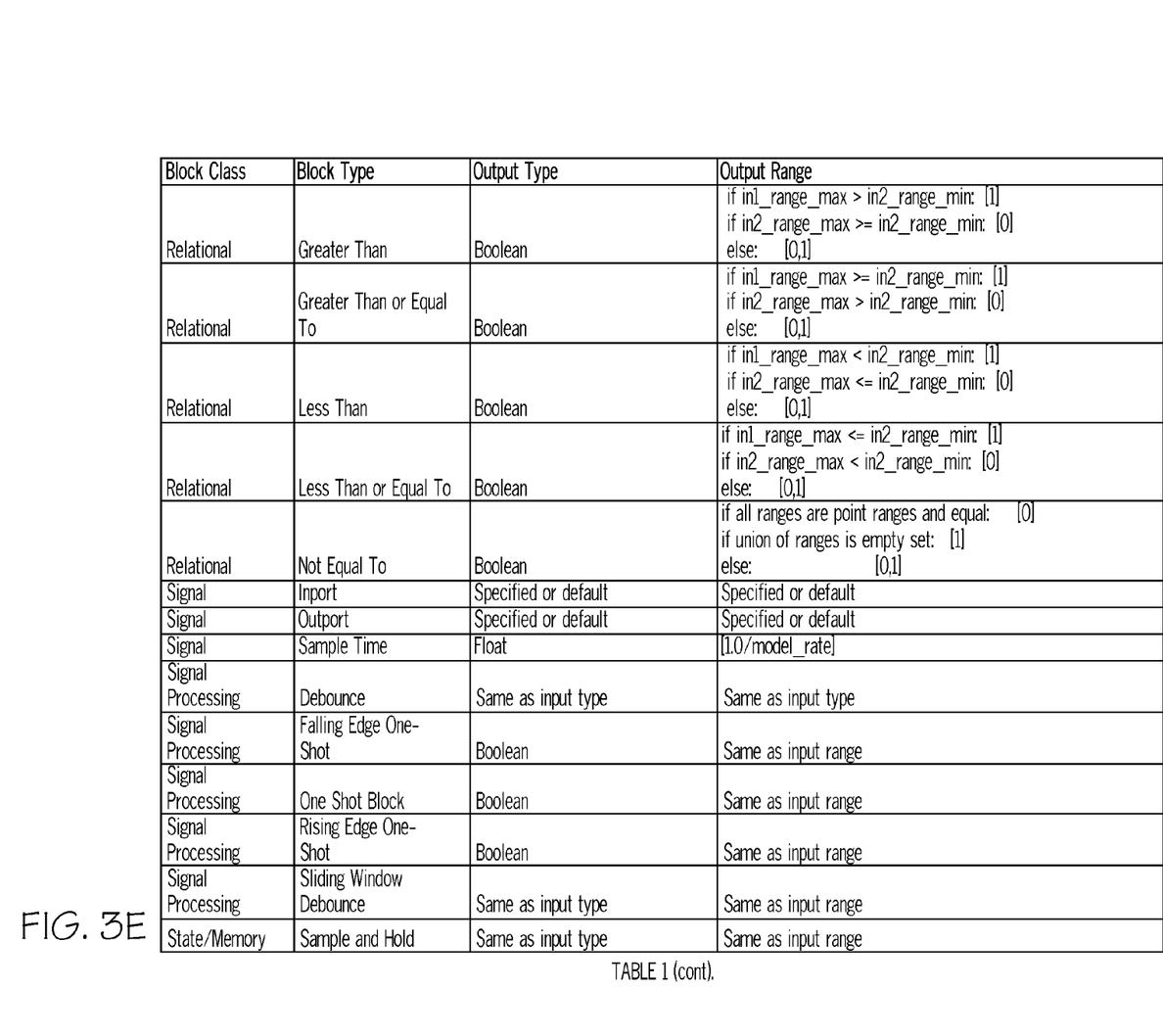
Figure 3F:
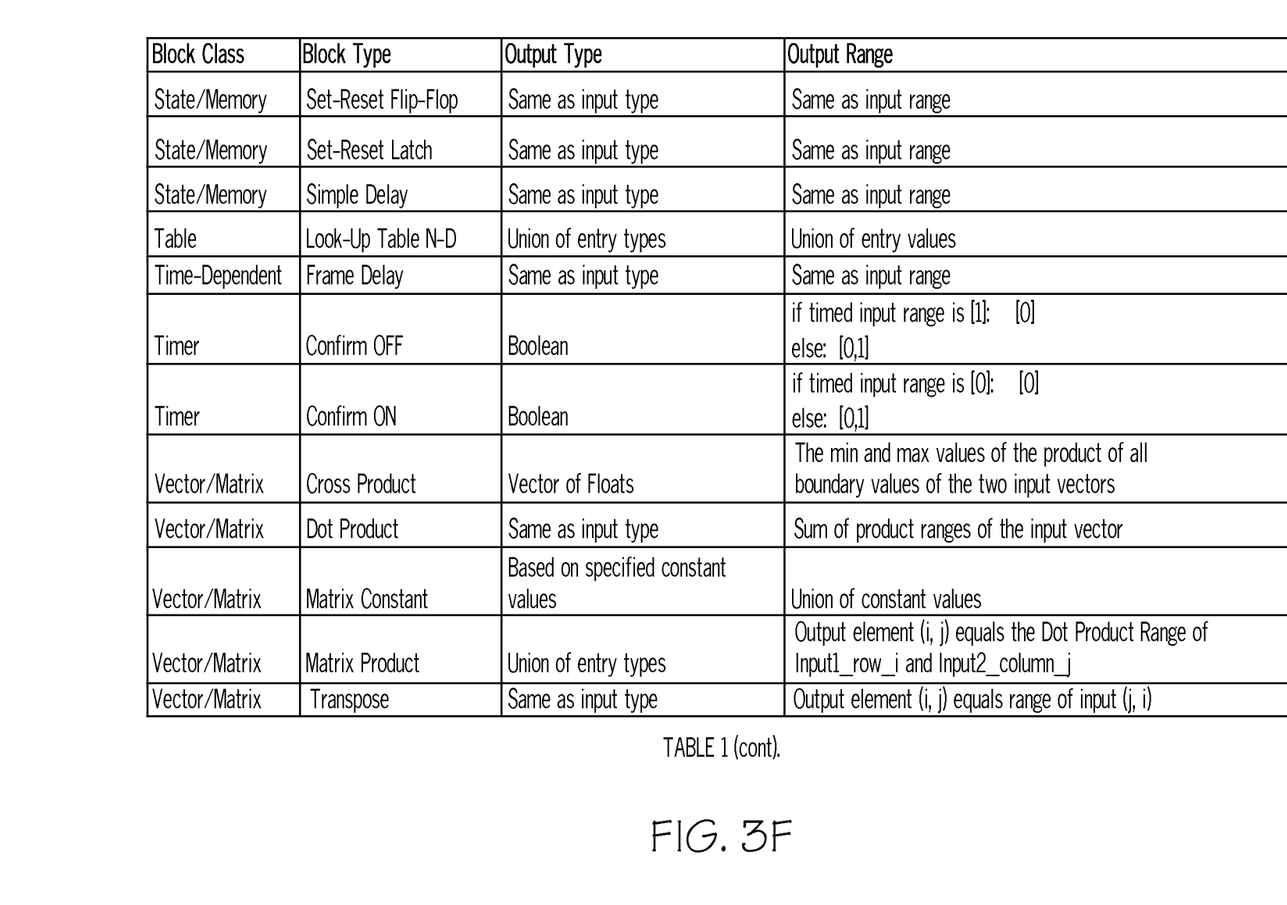

FIG. 2 is a block diagram illustrating a test generating system 200 of one embodiment of the present invention. A test generator takes data flow diagrams, such as diagram 100 shown in FIG. 1, and uses requirement-based templates, selective signal propagation and range comparison and intersection to generate test cases containing test vectors for those diagrams. Further general details pertaining to the design and operation of test generation systems are provided in references available to those of ordinary skill in the art, such as U.S. Pat. No. 7,644,344 and U.S. Patent Publication 2009/0287958 (both of which are incorporated herein in their entirety) and for that reason are not repeated herein.

Test generating system 200 in particular represents an advance over the prior art at least in the means provided for propagating data type and operating range data through the diagrams it processes. Test generating system 200 includes a processor 210 programmed with computer executable code for a test generation process 215 described herein, and at least one memory device 220 which includes one or more memories for storing a data flow diagram 230 and storing test case test vectors 240 produced by test generation process 215.

In operation, test generation process 215 inputs data flow diagram 230 for a model and propagates data type and operating range data for diagram 230 from its diagram level inport blocks to its diagram level outport blocks. In this propagation, the universal data type, language independent representation, and operating range are determined for all inputs and outputs of each block instance in the diagram 230. The propagation performed by test generation process 215 takes into account the specific mathematical and functional effects of each functional block, and where necessary, the larger context of how the block is connected within diagram 230.

In one embodiment, specific transformations associated with each of the different functional blocks used to construct diagram 230 are available via a range transformation data base 250. In one embodiment, range transformation data base 250 is stored in memory device 220 and accessed by processor 210 as test generation process 215 is performed. Table 1 (shown in FIGS. 3A-F) illustrates an example of the information provided by a range transformation data base 250 for one embodiment of the present invention. Table 1 illustrates only a sampling of the functional block types which can be included in a range transformation data base 250. Other embodiments may define additional functional block types.

In Table 1, each row provides information for the different block types that can potentially appear in diagram 230. For each entry, Table 1 indicates the block class and block type for which the entry applies, the output type of the data generated by the block type, and, where applicable, instructions as to how the output range is determined. For example, where a functional first block in diagram 230 is defined as a Dead Zone Limiter, test generation process 215 looks up the entry for a Dead Zone Limiter in Table 1 to determine the relevant output type and output range determination. In this case, process 215 will identify the output type for that first functional block as being the same as the input type. To determine the output range, process 215 will calculate the intersection of the input range and the range imposed by the dead zone limiter (which would have been specified in diagram 230). The output type and output range is then propagated as an input to the next functional block (or alternatively to an Outport block if there is no next functional block to propagate to). As another example, where a second functional block in diagram 230 is defined as a Mathematical class ArcCosine block type, test generation process 215 looks up the entry for an ArcCosine block in Table 1. In this case, process 215 will identify the output type for the second functional block as being a floating point decimal value and will calculate the output range by interpolating from the minimum range value of its input to the maximum range value of its input to fine the minimum and maximum possible output values.

In other embodiments, such as where object oriented programming is utilized, the details provided in Table 1 for each functional block type are instead stored within the objects that define each respective block in diagram 230. For example, an instance of a functional block in diagram 230 would be computed as an object having the properties associated with its particular block type. The output type and range data would be calculated and defined as properties of the object for that functional block instance.

Resolving type and range information for a functional block by looking up a formula in range transformation data base 250 can be best achieved when all of the input ranges for that block are readily available. This is not always the case however. For example, a functional block may be interconnected with itself or other blocks in diagram 230 to form a feedback loop. In that case, one or more inputs for the block will depend on the results of a previously determined output of that same block. To address such a situation, where all the input ranges of a block cannot be initially computed, the larger context of the model is analyzed. This can be accomplished, for example, through a pattern recognition process that associates the subject block's interconnection pattern (which can involve one or more additional blocks) with known signal behaviors. In one embodiment, the output signal for the block, based on its interconnection pattern, in analyzed for monotonicity (e.g. is the signal always increasing or always decreasing). Next, process 215 searches blocks around the subject block for a signal value limiting structure. If the search is successful, a range of the signal can be computed by computing loop invariants. If not, the signal may be unlimited and result in overflow or underflow conditions. Depending on the complexity of the feedback loop (which may, for example, include many nested loops), this calculation may be computationally intractable. Where computing loop invariants cannot resolve the range and data type of a signal in a feedback loop, the user may be required to specify the data type for the feedback loop signal similar to the feedback loop range specification. This can be specified in a feedback loop range file (shown at 260) stored in memory device 220.

In one embodiment, model inputs and certain intermediate signals (for example, particular signals in feedback loops) will have their data type and range information specified by the diagram 230. Where range information is needed for a block that has not been specified, in one embodiment, a warning or error is written to a status report. As mentioned above, where the range and data type of a signal in a feedback loop cannot be resolved, the user may be required to specify the data type for the feedback loop signal similar to the feedback loop range specification.

Alternatively, this range information can also be specified in a feedback loop range file 260. In one embodiment, feedback loop range information can alternately be specified within range transformation data base 250.

In one embodiment, one or more of the input ranges at a block may be split into two or more sub-ranges. Sub-ranges need not be all of the same type. Sub-ranges of different types may meet or intersect. For example, a split range may include the integers −5 to 0, the real numbers 0 to 6, and the odd integers 101 to 111. When ranges are split, the Output range may be determined by the union of the results of all combination of sub-ranges. For example, for a sum block with the first split input range 1 to 5 and 10 to 20 and the second split input range −10 to -8 and point value range 0, the output range is the union of ranges applied to the sum block for 1 to 5 and −10 to −8, 1 to 5 and 0, 10 to 20 and −10 to −8, and 10 to 20 and 0.

In another embodiment, the amount of computation associated with the all-to-all sub-range computation can be reduced by first simplifying two or more sub-ranges into a single sub-range or range. This may be done by creating a new range of the same or most inclusive type of the sub-ranges, by setting the min value of the new range as the lowest min of all the comprising sub-ranges, and setting the max of the new range as the highest max of all comprising sub-ranges. For example, a range that includes integer sub-ranges −5 to 5 and 8 to 100 can be simplified to a single integer range −5 to 100. Range simplification may reduce the computation associated with range propagation, but may result in looser ranges. Therefore, in one embodiment, range simplification is only performed if the number of sub-ranges is greater than a given threshold or if any the min and max values of two sub-ranges of the same type are close to each other within another given threshold.

In another embodiment, the amount of computation associated with the all-to-all sub-range computation can be reduced if the function associated with the block is continuous and monotonic and if one of the input values includes a continuous range of values around zero whose magnitude is larger than the largest gap in any split range for any other input when applied to the function. In this case, the net effect will be that the output range will have no gaps in it because it will always be possible to find some value from the continuous input that can result in an output value that fills in the range gap. The Output range can be computed by applying the min and max of the continuous range with the minimum of all min values of the other range and the maximum of all max values of the other ranges.

Figure 4:
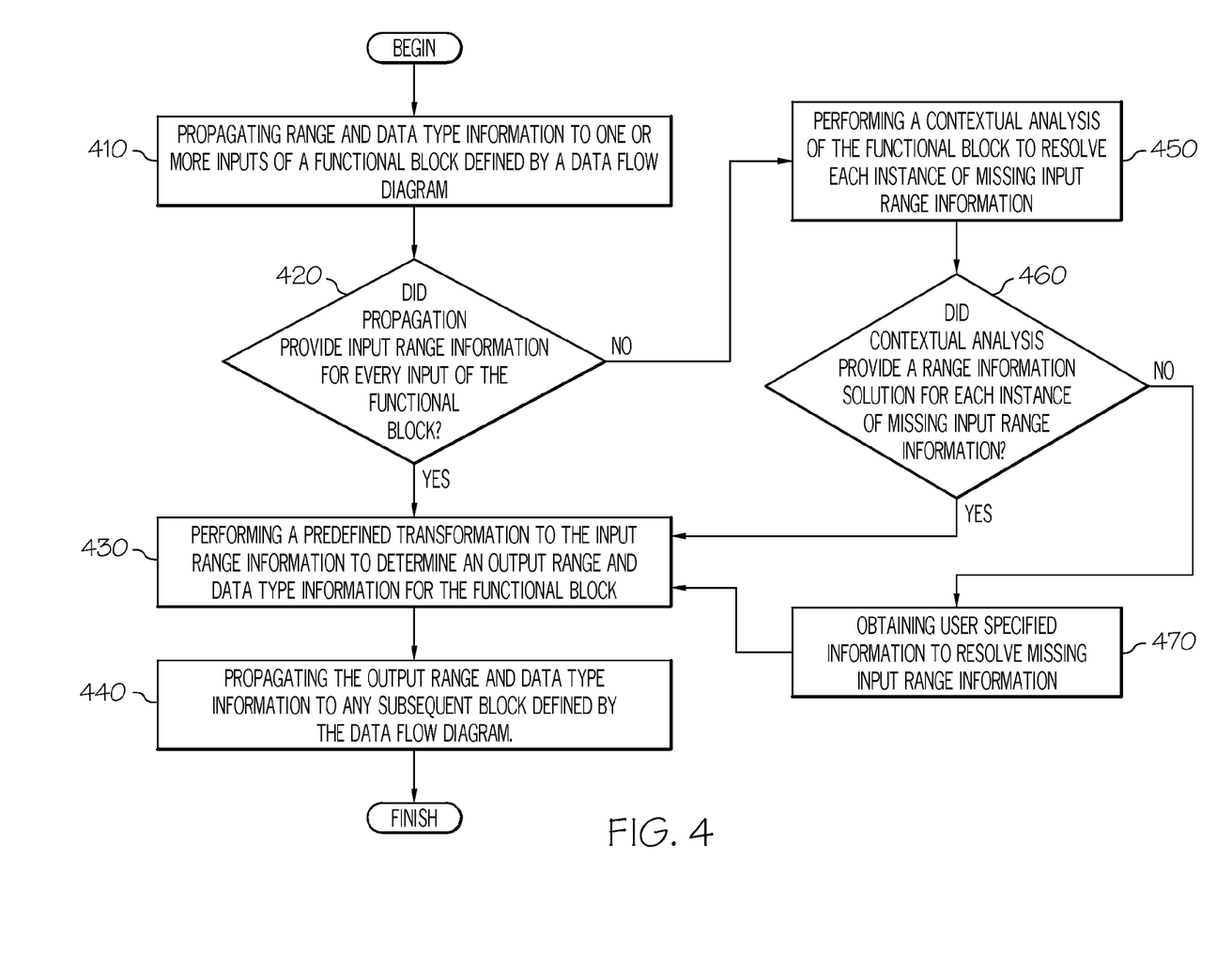
FIG. 4 is a flow chart illustrating a method for type and range propagation of one embodiment of the present invention.

FIG. 4 is a flow chart illustrating a method for conducting an analysis of a data flow diagram of one embodiment of the present invention. In one embodiment, the method of FIG. 4 is implemented through the execution of machine executable code by a processor. FIG. 2 provides one embodiment of a system 200 for performing the method of FIG. 4, though the use of systems other than system 200 is contemplated as being within embodiments of the present invention.

The method begins at 410 with propagating range and data type information to one or more inputs of a functional block defined by a data flow diagram. As explained above, depending on the location of the function block within the data flow diagram, the range and data type information propagated to the functional block may be received from either Inport block instances or from output range and data type information from preceding functional blocks. It is not necessary for the range information to be continuous but may instead be defined as a split range, as discussed above. Range data can also be defined for both an allowable range and an expected normal range. Ranges, data type, and other information deemed important for a particular model can also be specified within the file containing the diagram, in separate symbol files or default values may be used when information is not specified.

When input range information for all of the inputs of the functional block are provided from propagation (checked at block 420), the method proceeds to 430 with performing a predefined transformation to the input range information to determine an output range and data type information for the functional block. The predefined transformation is at least in part performed by applying specific mathematical and functional effects defined for the functional block. That is, the output range and data type for the functional block is computed by applying the semantics of the functional block to the input range and data type information.

As explained above with respect to FIG. 1, the calculation of output range and type information takes into account the specific functional computation of that block according to the block's requirements. Utilizing the specific functional computation of each incident function block in propagating ranges through the data flow diagram avoids results with looser bounds on downstream signals. In one embodiment, propagating the range and data type information includes determining an output range and data type information for each of the one or more function blocks based on specific mathematical and functional effects for each of the one or more function blocks, and propagating said output range and data type information to any subsequent functional blocks.

In one embodiment, performing the predefined transformation to the input range information is achieved by looking up a specific transformation formula defined for that block's block type via a range transformation data base. Table 1, described above, provides an example of one such range transformation data base. In other embodiments, such as where object oriented programming is utilized, the specific criteria for performing the predefined transformation to the input range information for each of the different functional blocks are instead stored within the objects that define each respective block in the diagram.

In one embodiment, where range information is needed on block whose semantics have not been specified, a warning or error is written to a status report. In another embodiment, a user is prompted to provide the missing information. Also, if the block's computation and the input range values are such that an overflow condition (for example, a divide by zero) is possible on the output, the high end of the output range may be computed using a small offset from the value that would produce the condition. In other embodiments, a user warning is generated.

The method next proceeds to 440 with propagating the output range and data type information to any subsequent block defined by the data flow diagram.

When input range information for all of the inputs of the functional block are not provided from propagation (checked at block 420), the method proceeds to 450 with performing a contextual analysis of functional block to resolve each instance of missing input range information. Such a condition may occur, for example, where one or more inputs of the functional block are coupled to a feedback loop. In that case, values presented at such inputs are dependent on previous outputs from the functional block. In one embodiment, performing the contextual analysis comprises a pattern recognition process that associates the subject block's interconnection pattern with known signal behaviors. In one embodiment, the contextual analysis further comprises the step of analyzing the blocks output signal for monotonicity (e.g. to determine if the signal always increasing or always decreasing). Next, the contextual analysis searches the diagram for signal value limiting structures that would limit the possible values of the blocks output. When the contextual analysis is successful (checked at block 460), a range solution for the feedback signal can be achieved by computing loop invariants to provide the missing input range information. With the previously missing input range information now available, the method can proceed back to 430 with performing the predefined transformation for that block.

When the contextual analysis is not successful, meaning that solutions were not resolved for one or more instances of missing input range information, the signal may be unlimited and result in overflow or underflow conditions. Depending on the complexity of the feedback loop (which may, for example, include many nested loops), this calculation may be computationally intractable. In this case, where computing loop invariants cannot resolve the range and data type of a signal in a feedback loop, the method proceeds to 470 with obtaining user specified information to resolve missing input range information. In one embodiment, the user provided range information can be specified in a feedback loop range file which is accessed by the method. Then, using the user specified information in place of the missing range information, the method can proceed back to 430 with performing the predefined transformation for that block.

As such, the method above provides the means for determining and propagating range and data type information from each Inport block instance of the data flow diagram through the functional blocks defined by the data flow diagram. The range and data type of all inputs and outputs of each intermediate functional block are computed by propagating the information for each Inport block instance downstream and applying it to the semantics of each incident functional block. This propagation continues until the range and data type for all model Outport instances are determined from the outputs of the immediately upstream blocks. In one embodiment, both maximum allowable and expected normal operating ranges are propagated from the inport blocks, through the functional blocks, to the outport blocks.

Several means are available to implement the systems and methods discussed in this specification. These means include, but are not limited to, digital computer systems, microprocessors, general purpose computers, programmable controllers and field programmable gate arrays (FPGAs) or application-specific integrated circuits (ASICs). Therefore other embodiments of the present invention are program instructions resident on computer readable media which when implemented by such means enable them to implement embodiments of the present invention. Computer readable media include any form of a physical computer memory storage device. Examples of such a physical computer memory device include, but are not limited to, punch cards, magnetic disks or tapes, optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method for conducting an analysis of a data flow diagram, the method comprising:
   propagating range information, language independent representations, and data type information to one or more inputs of a functional block defined by a data flow diagram;
   performing a predefined transformation to the input range information to determine an output range, language independent representation, and data type information for the functional block, wherein the predefined transformation is at least in part performed by applying specific mathematical and functional effects defined for the functional block; and
   propagating the output range, language independent representation, and data type information to any subsequent block defined by the data flow diagram;
   wherein the range information and data type information is computed for a parent block type functional block by recursively performing a range and hierarchical data type information computation on one or more sub-models that define the parent block type functional block, wherein the parent block type functional block is hierarchically decomposed into one or more sub-models to specify functions performed as part of the parent block type functional block;
   wherein the hierarchical data type information computation determines at least one data type based on the internal structures of variables used by the one or more sub-models; and
   wherein the range type information computation determines input and output ranges of the one or more sub-models.

2. The method of claim 1, wherein when propagation did not provide input range information for every input of the functional block, the method further comprises:
   performing a contextual analysis of the functional block to resolve each instance of missing input range information.

3. The method of claim 2, wherein when the contextual analysis identifies a feedback loop, the test generation process computes input range information by computing loop invariants;
   wherein computing loop invariants comprises analyzing a feedback signal for either a monotonically increasing or decreasing variable value; and
   wherein computing loop invariants comprises analyzing the data flow diagram for signal value limiting structures.

4. The method of claim 1, further comprising obtaining user specified information to resolve missing input range information.

5. The method of claim 1, wherein a criteria for determining output range and data type information for the functional block is either specified via a range transformation data base, or is specified within objects that define the data flow diagram.

6. A test generating system for processing data flow diagrams, the system comprising:
a processor programmed to perform a test generation process; and
at least one memory device coupled to the processor, the at least one memory device including a data flow diagram;
wherein the test generation process determines range information, language independent representation, and data type information for outputs of one or more functional blocks defined by the data flow diagram by applying transformations to input range information for inputs of each of the one or more functional blocks, wherein the transformations propagate the range information, language independent representation, and data type information through the one or more functional blocks;
wherein the transformations are at least in part performed by applying specific mathematical and functional effects that are pre-defined for each of the one or more functional blocks based on block type; and
wherein the range information and data type information is computed for a parent block type functional block by recursively performing a range and data type information computation on one or more sub-models that define the parent block type functional block, wherein the parent block type functional block is hierarchically decomposed into one or more sub-models to specify functions performed as part of the parent block type functional block;
wherein the data type information computation determines at least one data type based on the internal structures of variables used by the one or more sub-models; and
wherein the range type information computation determines input and output ranges of the one or more sub-models.

7. The system of claim 6, wherein the transformation is further performed by the test generation process for at least a first functional block of one or more functional blocks based on a contextual analysis.

8. The system of claim 7, wherein when the contextual analysis identifies a feedback loop, the test generation process computes input range information by computing loop invariants.

9. The system of claim 8, wherein computing loop invariants comprises:
analyzing a feedback signal for either a monotonically increasing or decreasing variable value; and
analyzing the data flow diagram for signal value limiting structures.

10. The system of claim 7, wherein the test generation process calls for user specified range and data type information when the contextual analysis does not provide a range solution for at least one input of a first functional block of one or more functional blocks.

11. The system of claim 10, wherein the user specified range and data type information is stored in a feedback loop range file.

12. The system of claim 6, wherein the at least one memory device further includes a range transformation data base accessed by the test generation process to determine the specific mathematical and functional effects to be applied to each of the one or more functional blocks.

13. The system of claim 6, wherein the specific mathematical and functional effects to be applied to each of the one or more functional blocks are specified within objects that define the data flow diagram.

14. The system of claim 6, wherein the test generation process calls for user specified range and data type information when the specific mathematical and functional effects are not defined for one or more of the functional blocks.

15. The system of claim 6, wherein the test generation process calculates at least one output range for a first functional block of the one or more functional blocks by interpolating outputs from a function performed by the first functional block across a range of inputs to the first functional block.

16. The system of claim 6, wherein the input range information for at least one of the one or more functional blocks comprises a split range and the output range information is determined by a union of all combinations of sub-ranges.

17. The system of claim 16, wherein at least two sub-ranges of the split input range are simplified prior to determining the union of all combinations of sub-ranges.

18. The system of claim 6, wherein the input range information for at least a first block of the one or more functional blocks comprises a split range, a function associated with the first block is continuous and monotonic, and at least one input value for the first block includes a continuous range of values around zero whose magnitude is larger than a largest gap in any split range when applied to the function; and
wherein an output range for the first block is computed with no gaps based only upon the continuous range, a minimum min value, and a maximum max value.

19. A non-transitory computer readable media device having computer-executable instructions for performing range and type information transformation for functional blocks of a data flow diagram, the method comprising:
determining range information, language independent representations, and data type information for outputs of one or more functional blocks defined by the data flow diagram by applying transformations to input range information for inputs of each of the one or more functional blocks, wherein the transformations propagate the range information, language independent representations, and data type information through the one or more functional blocks, wherein the transformations are at least in part performed by applying specific mathematical and functional effects that are pre-defined for each of the one or more functional blocks based on block type;
wherein the range information and data type information is computed for a parent block type functional block by recursively performing a range and data type information computation on one or more sub-models that define the parent block type functional block, wherein the parent block type functional block is hierarchically decomposed into one or more sub-models to specify functions performed as part of the parent block type functional block;
wherein the data type information computation determines at least one data type based on the internal structures of variables used by the one or more sub-models; and
wherein the range type information computation determines input and output ranges of the one or more sub-models.

* * * * *